(12) United States Patent
Johnson et al.

(10) Patent No.: US 12,486,804 B2
(45) Date of Patent: Dec. 2, 2025

(54) JOINTS BETWEEN ACOUSTIC PANELS

(71) Applicant: Raytheon Technologies Corporation, Farmington, CT (US)

(72) Inventors: Jackson David Johnson, Mishawaka, IN (US); Benjamin G. Gardell, Bristol, CT (US); Keith B. Allyn, Rutland, MA (US)

(73) Assignee: RTX Corporation, Farmington, CT (US)

( * ) Notice: Subject to any disclaimer, the term of this patent is extended or adjusted under 35 U.S.C. 154(b) by 175 days.

(21) Appl. No.: 18/326,205

(22) Filed: May 31, 2023

(65) Prior Publication Data

US 2024/0401533 A1 Dec. 5, 2024

(51) Int. Cl.
*F02C 7/24* (2006.01)
*G10K 11/16* (2006.01)

(52) U.S. Cl.
CPC ............... *F02C 7/24* (2013.01); *G10K 11/16* (2013.01); *F05D 2250/121* (2013.01); *F05D 2250/283* (2013.01); *F05D 2260/96* (2013.01)

(58) Field of Classification Search
CPC ..... F02C 7/24; G10K 11/16; F05D 2250/121; F05D 2250/283; F05D 2260/96
USPC .................................. 181/214, 288; 60/725
See application file for complete search history.

(56) References Cited

U.S. PATENT DOCUMENTS

| | | | | |
|---|---|---|---|---|
| 3,914,486 A | * | 10/1975 | Borgford | E04C 2/3405 428/116 |
| 4,370,372 A | * | 1/1983 | Higgins | F16B 13/141 428/116 |
| 6,017,413 A | * | 1/2000 | Franklin | B29C 66/1142 428/116 |
| 6,256,959 B1 | * | 7/2001 | Palmersten | E04B 7/22 52/145 |
| 6,837,659 B2 | * | 1/2005 | Oberkofler | F16B 5/01 411/479 |

(Continued)

FOREIGN PATENT DOCUMENTS

| CN | 107386493 A | | 11/2017 |
|---|---|---|---|
| CN | 207484822 U | * | 6/2018 |

(Continued)

OTHER PUBLICATIONS

Machine translation of CN 216516579 (Year: 2022).*

(Continued)

*Primary Examiner* — Dedei K Hammond
*Assistant Examiner* — Jennifer B. Olson
(74) *Attorney, Agent, or Firm* — Carlson, Gaskey & Olds, P.C.

(57) ABSTRACT

An acoustic structure includes at least a pair of adjacent panels. The panels have edges, and the panels define a plurality of cells. A first of the at least a pair of acoustic panels is connected to a second of the pair of acoustic panels at adjacent ones of the edges. There is a pair of spaced faces in each acoustic panel between which the plurality of cells extend. There are openings in each of the edges of each of the adjacent acoustic panels, and between a first of the faces and a second of the faces. A securing member extends through the openings in each of the first and the second of the adjacent acoustic panels. A gas turbine engine is also disclosed.

11 Claims, 7 Drawing Sheets

(56) References Cited

U.S. PATENT DOCUMENTS

| | | | |
|---|---|---|---|
| 7,954,224 B2 * | 6/2011 | Douglas | B21D 39/021 29/521 |
| 8,579,076 B2 | 11/2013 | Ayle et al. | |
| 10,823,059 B2 | 11/2020 | Herman et al. | |
| 2003/0173460 A1 | 9/2003 | Chapman, Jr. | |
| 2009/0242321 A1 | 10/2009 | Harper | |
| 2021/0256947 A1 | 8/2021 | Lin et al. | |

FOREIGN PATENT DOCUMENTS

| | | | |
|---|---|---|---|
| CN | 113266470 A | | 8/2021 |
| CN | 216516579 | * | 5/2022 |
| IT | PD940094 A1 | | 11/1995 |

OTHER PUBLICATIONS

Machine translation of CN207484822 (Year: 2018).*
European Search Report for EP Application No. 24179323.1 dated Nov. 21, 2024.

* cited by examiner

JOINTS BETWEEN ACOUSTIC PANELS

BACKGROUND OF THE INVENTION

This application relates to structure for securing edges of acoustic panels.

Acoustic panels are utilized in any number of applications. In one type of acoustic panel there are cells formed of various cross-sectional shapes that serve to attenuate sound. Often a face plate is placed outwardly of a group of cells with the face plate having small perforations.

One application of such acoustic panels is in a gas turbine engine. Gas turbine engines do raise sound challenges and acoustic panels are often placed within an inner surface of an outer fan case. This makes the engine operation quieter.

When utilized inside a fan case, the panels are generally formed along cylindrical portions such that a plurality of the panels can form a full hoop around an axis of rotation of the engine. Some structure for securing adjacent panels is typically used.

Much of the securing structure for adjacent acoustic panels block at least some of cells, thus reducing the sound reducing efficiency.

SUMMARY OF THE INVENTION

In a featured embodiment, an acoustic structure includes at least a pair of adjacent panels. The panels have edges, and the panels define a plurality of cells. A first of the at least a pair of acoustic panels is connected to a second of the pair of acoustic panels at adjacent ones of the edges. There is a pair of spaced faces in each acoustic panel between which the plurality of cells extend. There are openings in each of the edges of each of the adjacent acoustic panels, and between a first of the faces and a second of the faces. A securing member extends through the openings in each of the first and the second of the adjacent acoustic panels.

In another embodiment according to the previous embodiment, the plurality of cells are generally diamond shaped and the edges extend along a zigzag path.

In another embodiment according to any of the previous embodiments, the plurality of cells are generally square shaped and the edges are generally straight.

In another embodiment according to any of the previous embodiments, the openings in each of the edges of the first and second panels extend into an outer surface of the edges. The openings in each of the edges in the first and the second the acoustic panel are adjacent to each other and receive the securing member.

In another embodiment according to any of the previous embodiments, the openings in the edges of the first and second panels are angled notches.

In another embodiment according to any of the previous embodiments, the notches extend along an angled surface at an angle that is less than 45 degrees relative to an apex of the angled surfaces.

In another embodiment according to any of the previous embodiments, the openings are holes through walls defining the edges.

In another embodiment according to any of the previous embodiments, the securing member is a solid pin.

In another embodiment according to any of the previous embodiments, the securing member extends outwardly beyond the acoustic structure and is utilized to secure the acoustic structure to another structure.

In another embodiment according to any of the previous embodiments, the panel are part cylindrical sections.

A gas turbine engine includes a core engine including a compressor and a turbine. Acoustic structure is positioned on a surface of the gas turbine engine. The acoustic structure includes at least a pair of adjacent panels. The panels have edges, and the panels define a plurality of cell. A first of the at least a pair of acoustic panels is connected to a second of the pair of acoustic panels at adjacent ones of the edges. There is a pair of spaced faces in each acoustic panel between which the plurality of cells extend. There are openings in each of the edges of each of the adjacent acoustic panels, and between a first of the faces and a second of the faces. A securing member extends through the openings in each of the first and the second of the adjacent acoustic panels.

In another embodiment according to any of the previous embodiments, the plurality of cells are generally diamond shaped and the edges extend along a zigzag path.

In another embodiment according to any of the previous embodiments, the plurality of cells are generally square shaped and the edges are generally straight.

In another embodiment according to any of the previous embodiments, the openings in each of the edges of the first and second panels extend into an outer surface of the edges. The openings in each of the edges in the first and the second the acoustic panel are adjacent to each other and receive the securing member.

In another embodiment according to any of the previous embodiments, the openings in the edges of the first and second panels are angled notches.

In another embodiment according to any of the previous embodiments, the notches extend at an angle that is less than 45 degrees relative to an apex of the angled surfaces.

In another embodiment according to any of the previous embodiments, the openings are holes through walls defining the edges.

In another embodiment according to any of the previous embodiments, the securing member is a solid pin.

In another embodiment according to any of the previous embodiments, the securing member extends outwardly beyond the acoustic structure and is utilized to secure the acoustic structure to another structure.

In another embodiment according to any of the previous embodiments, there is a fan and a surrounding fan case and the acoustic structure is positioned on an inner surface of the fan case.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
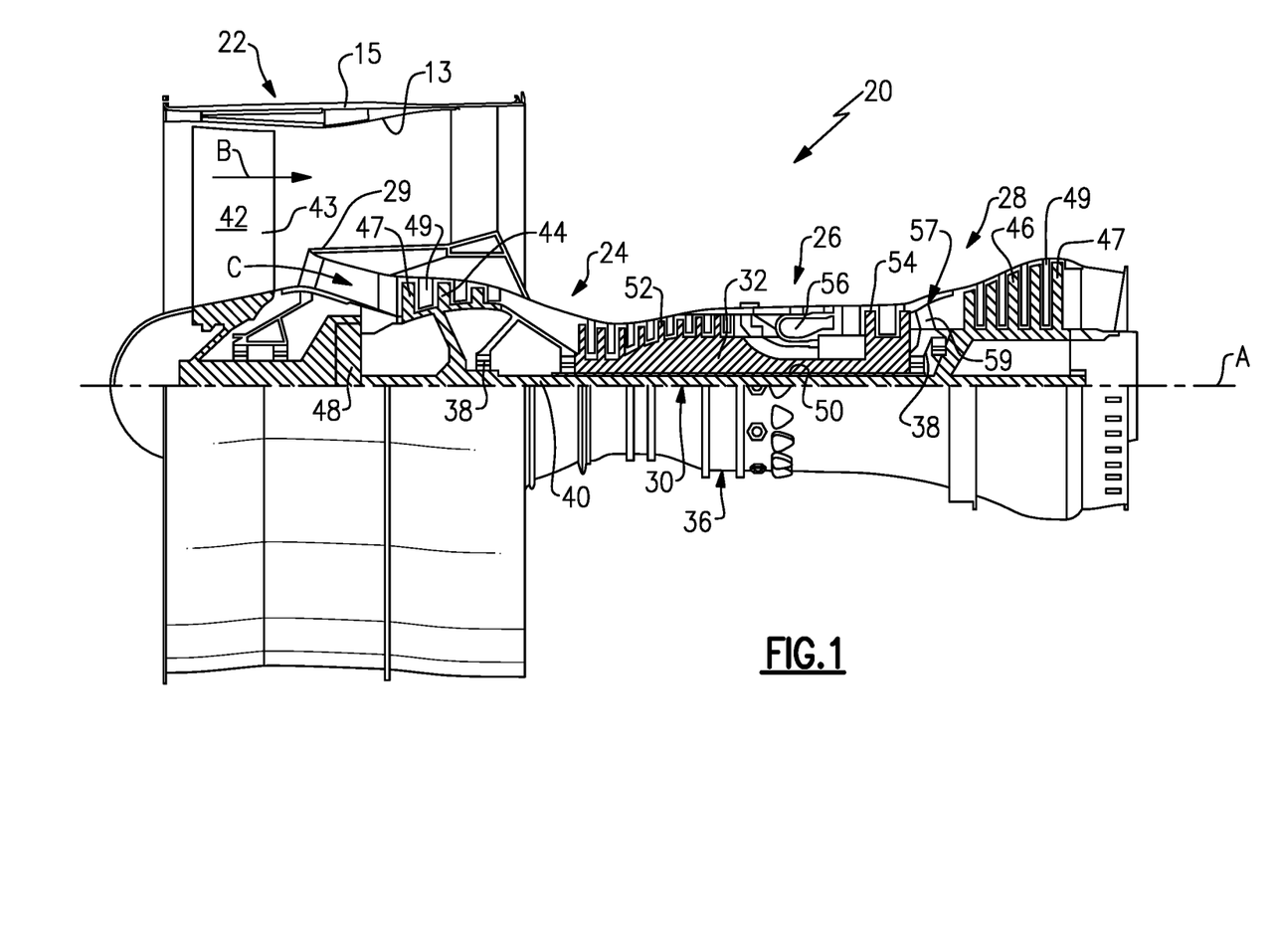
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
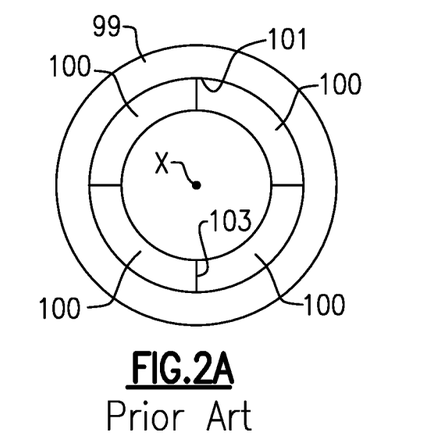
FIG. 2A schematically shows the interior of a fan case and acoustic treatment.

FIG. 2A shows a prior art fan case 99 having a plurality of circumferentially spaced acoustic panels 100. While four are shown here it should be understood that in practice a much larger number may typically be utilized. The acoustic panels 100 are secured to an inner periphery 101 of fan case 99. As shown, there are circumferential edges 103 between adjacent ones of the panels 100.

As shown here the panels 100 each form part cylindrical sections centered on a central axis X of the engine.

While this disclosure specifically illustrates circumferential edges 103 receiving connecting structure it should be understood that the disclosure may relate to acoustic panels utilized in applications other than gas turbine engines. Thus, while the panels 100 are shown to be cylindrical sections, the teachings of this disclosure could extend to planar acoustic panels, and connecting edges other than circumferential edges.

Figure 2B:
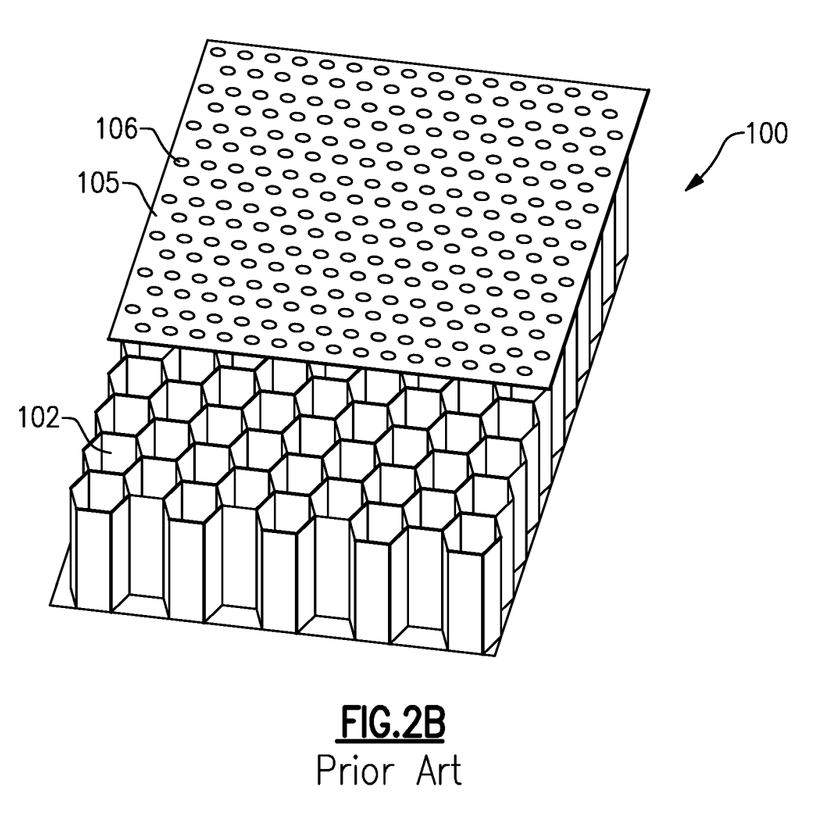
FIG. 2B shows a prior art acoustic treatment.

As shown in the prior art FIG. 2B, panels 100 have a plurality of cells 102. The cells may be honeycombed. A face plate 105 sits outwardly of the cells 102. The face plate 105 has a plurality of perforations 106. The combination of the face plate 105 and the cells 102 serves to attenuate noise.

Challenges are raised for securing adjacent panels.

Figure 3A:
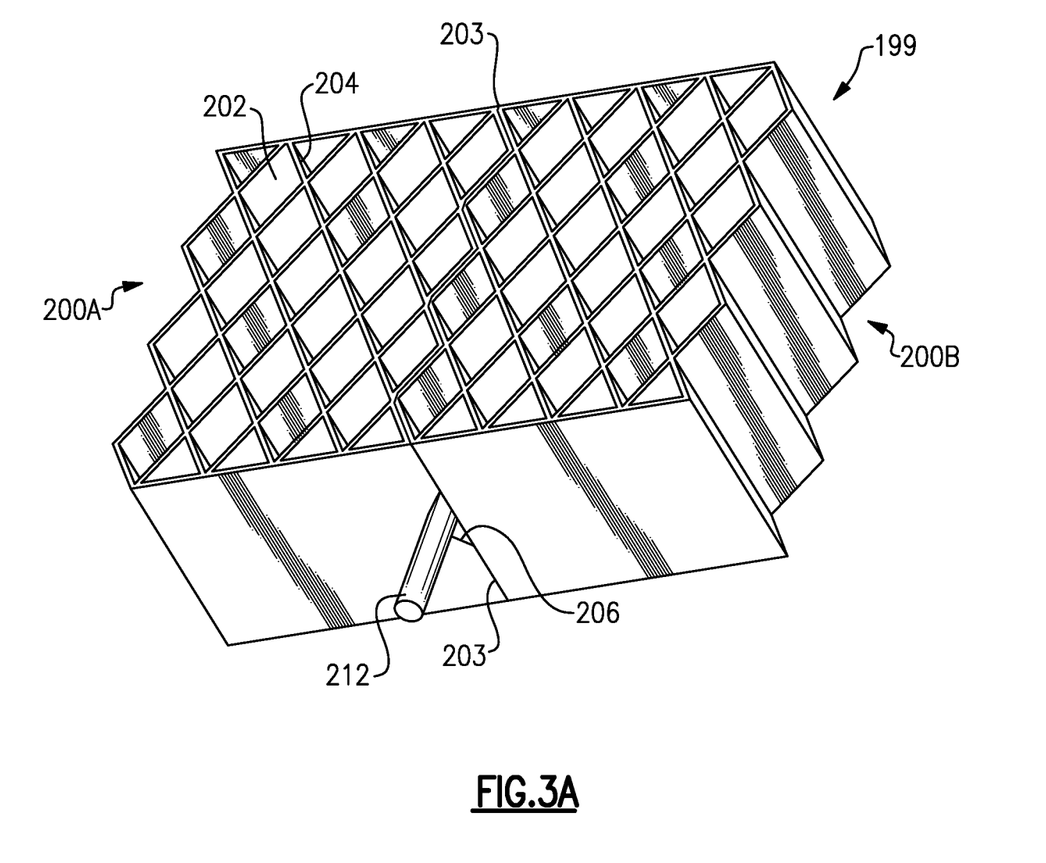
FIG. 3A shows a first embodiment of a connection for adjacent panels.

FIG. 3A shows embodiment 199 for securing two adjacent panels 200A and 200B. As shown here the cells 202 are diamond shaped and formed by crossing walls 204. The circumferential edge 203 can be seen to be effectively zig zagged due to the alternating inward and outward movement of the walls 204. A pin 212 is shown extending through the walls 204 at the circumferential edges 203 and securing panel 200A to 200B.

Figure 3B:
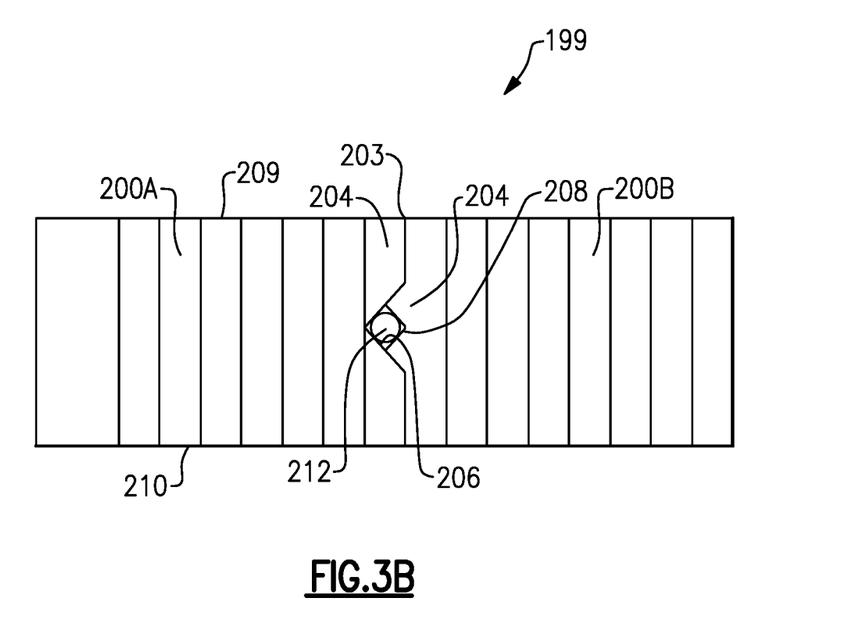
FIG. 3B shows a further detail of the FIG. 3A embodiment.

FIG. 3B shows the embodiment 199. Panel 200A has a diamond shaped notch 206 formed into each of the walls 204 at the circumferential edge 203. The panel 200B has a smaller diamond shaped notch 208 which extends into notch 206. The pin 212 extends through the space formed by notch 208 and thus between walls 204 of the adjacent panels 200A and 200B. It should be understood at the opposed circumferential edge of panel 200A there may be a structure similar to structure 208 for securing to the next adjacent panel. Similarly, the other edge of panel 200B may have the larger notch 206 to be secured to the next circumferentially adjacent panel.

The embodiment 199 prevents radial movement only. However, since the panels will in combination provide a full hoop, the panels themselves will hold each other in place circumferentially.

As one can see, the panel 200 has outer faces 209 and 210 with the cells 202 extending between those outer faces. The notches 206/208 are formed intermediate or between a first of the faces 209/210 and the other. That is, they are spaced from faces 209/210.

It should be understood that the pin 212 being relatively small only blocks a small portion of the effected cells 202. Thus, the adjacent segments could be held together reliably and without undue impact to the sound attenuation.

Figure 4A:
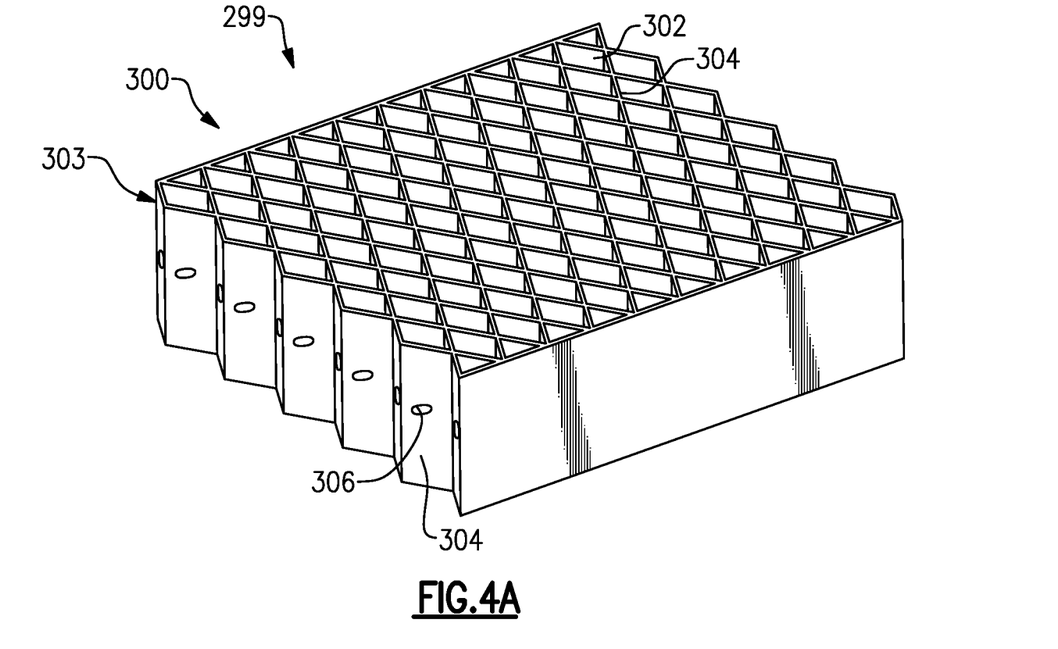
FIG. 4A shows a second embodiment acoustic panel.

FIG. 4A shows an embodiment 299 with panel 300. As can be seen, panel 300 has diamond shaped cells 302 formed by zig zagged walls 304. However, at the circumferential edge 303 there are holes 306 formed through the walls 304.

Figure 4B:
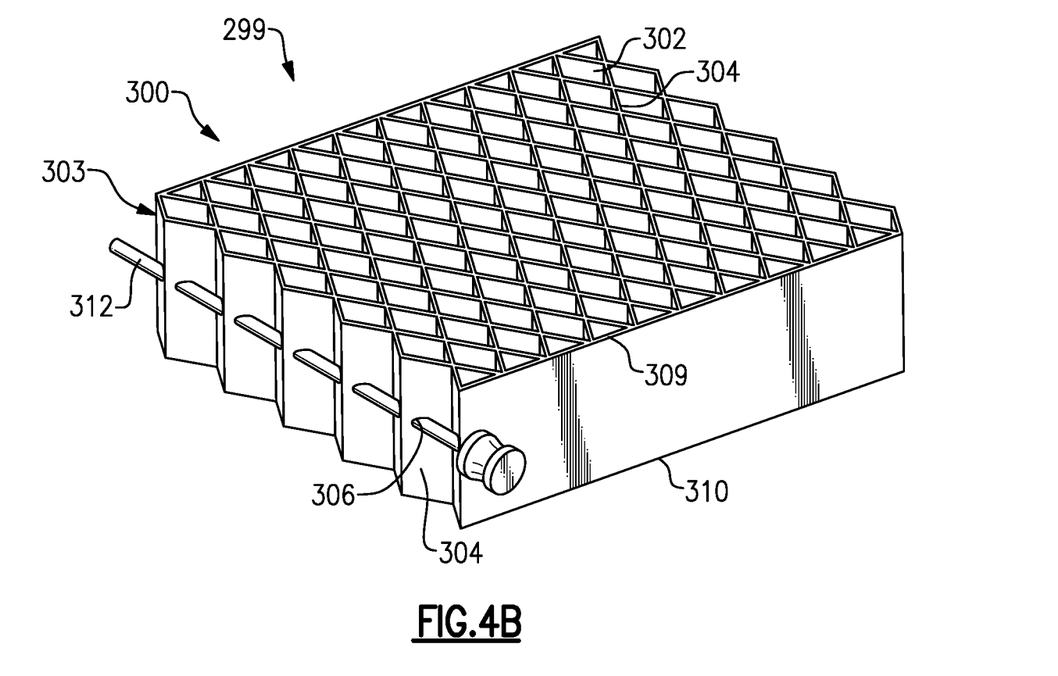
FIG. 4B shows the second embodiment acoustic panel receiving a connecting pin.

As shown in FIG. 4B the pin 312 will extend through those holes. Of course pin 312 is inserted through holes 306 in adjacent panels 300 at the same time.

As one can see, the panel 300 has outer faces 309 and 310 with the cells 202 extending between those outer faces. The holes 306 are formed intermediate or between a first of the faces 309/310 and the other. That is, they are spaced from faces 309/310.

Figure 4C:
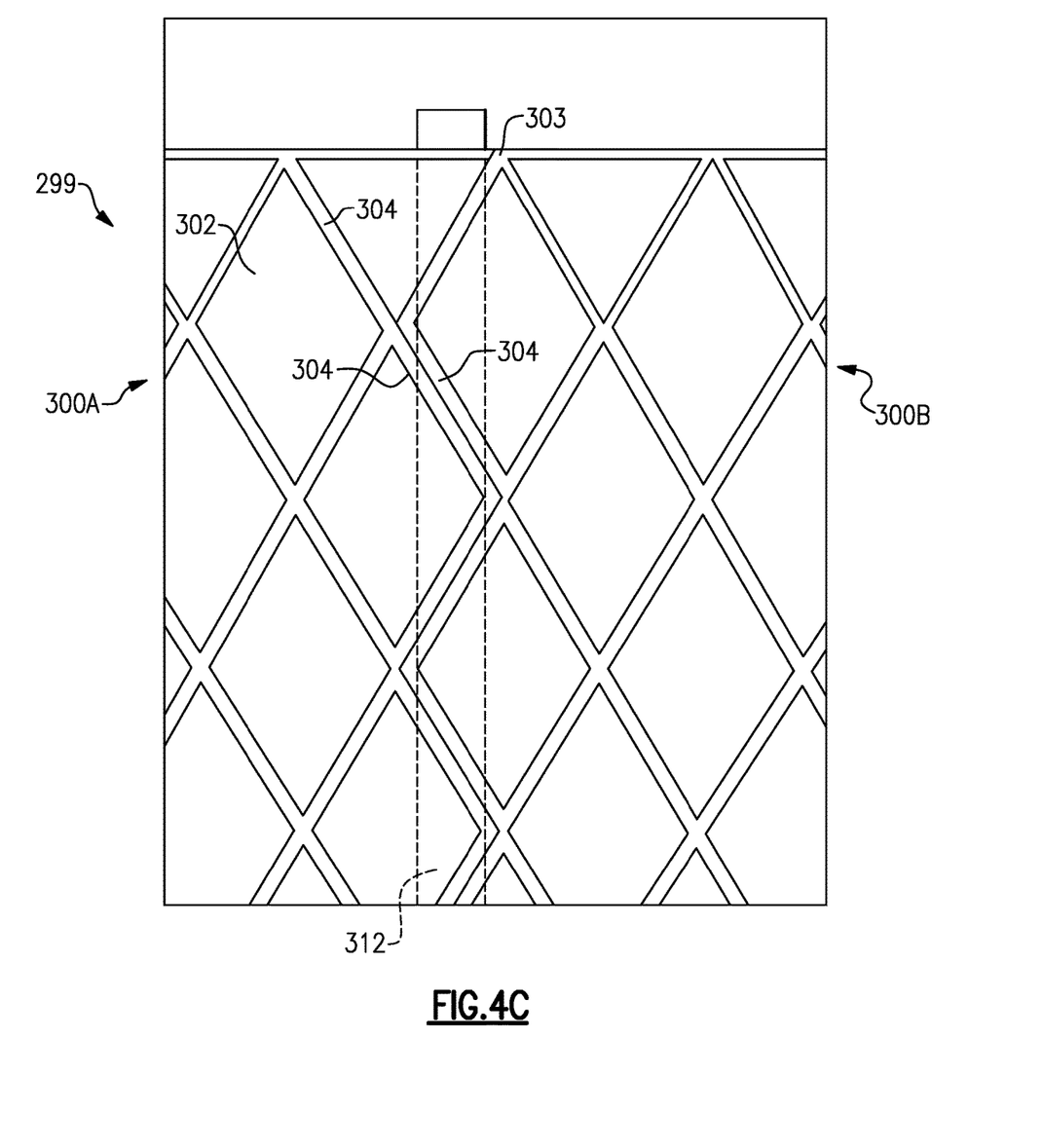
FIG. 4C shows two adjacent acoustic panels secured together in the second embodiment.

FIG. 4C shows an embodiment 299 with circumferentially adjacent assembled panels 300A and 300B. These panels have diamond shaped cells 302 defined by walls 304. The walls 304 of both panels are formed with the holes 306 such that pin 312 extends through holes in each of the panels. Since the adjacent panels surround the pin 312, the pin 312 will constrain the adjacent segments in both the radial and circumferential direction. Again, the pin 312 being relatively small will cause limited impact on the sound attenuation.

Figure 5A:
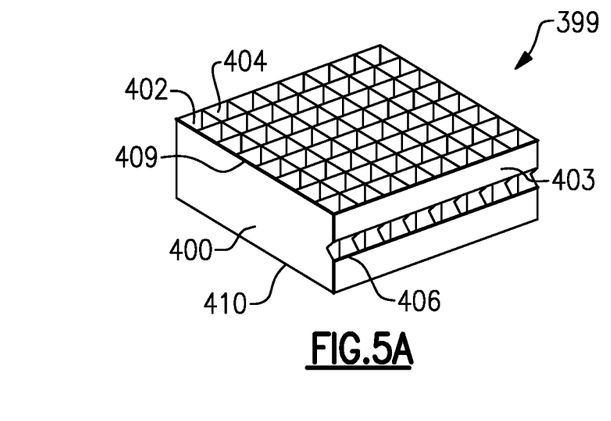
FIG. 5A shows a third embodiment acoustic panel.

FIG. 5A shows another embodiment 399 having panel 400. The cells 402 here are generally square, such that the walls 404 do not zigzag at the circumferential edges 403.

Again, a notch 406 is formed in the edge 403. The notch 406 may be similar to the FIG. 3B notch 206.

Figure 5B:
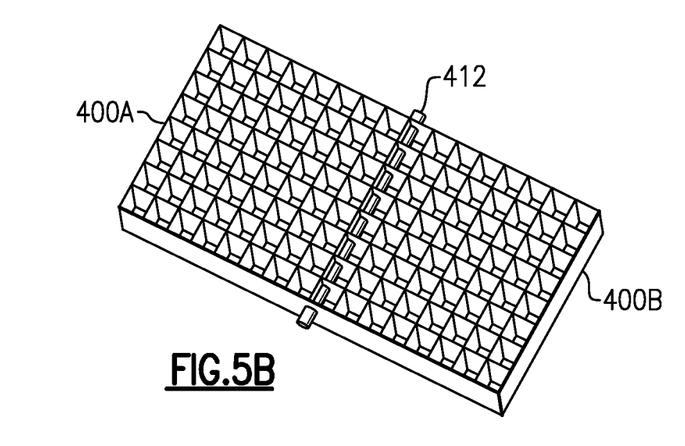
FIG. 5B shows the connection of two adjacent ones of the third embodiment panels.

FIG. 5B shows adjacent panels 400A and 400B secured by the pin 412. The panel 400B may have structure similar to the notch 208 as shown in the FIG. 3B embodiment.

As one can see, the panel 400 has outer faces 409 and 410 with the cells 202 extending between those outer faces. The notches 406/408 are formed intermediate or between a first of the faces 409/410 and the other. That is, they are spaced from faces 409/410.

It could be said in the FIGS. 3A/3B and 5A/5B embodiments the openings 206/208/406 in each of the edges of the first and second panels extend into an outer surface of the edges, with the openings in each of the first and second the acoustic panel edges being adjacent to each other and receiving the securing member.

The openings 206/208/406 in the edges of the first and second panels in the FIGS. 3A/3B and 5A/5B embodiments are angled notches.

It should be understood that while the pins are shown to be generally cylindrical any number of shapes and structure could be utilized for the pins.

It could be said embodiment under this disclosure have a pair of spaced faces 209/210, 309/310, 409/410 in each acoustic panel between which the cells extend, and there being openings 206/208, 306, 406 in each of edges of each of the adjacent acoustic panels, and between a first of the faces and a second of the faces, with a securing member 212, 312, 412 extending through the openings in each of the first and second adjacent acoustic panels.

Figure 6:
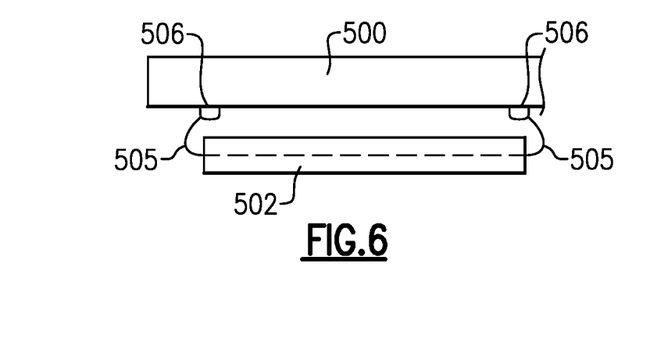
FIG. 6 shows an embodiment of a structure for securing acoustic panels to a fan case.

FIG. 6 shows another embodiment for securing the assembled panels to a fan case 500. Rather than a pin, a structure 505 may extend through the openings in the panels 502 and be utilized to secure the panels 502 to the fan case as shown at 506. Structure 505 may be a wire.

Figure 7:
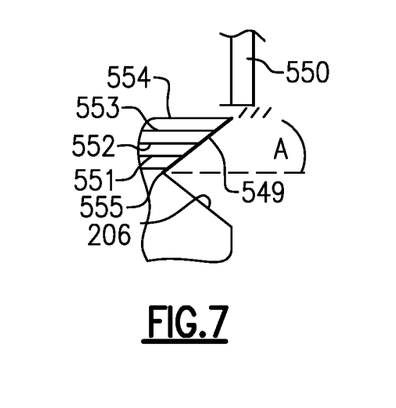
FIG. 7 schematically shows a challenge when utilizing additive manufacturing to form certain structure in such panels.

In an embodiment, the panels may be formed of an appropriate material and from additive manufacturing. When forming a notch such as notches 206, 208 or 406 one can see that an inner wall 549 extends at an angle A as shown in FIG. 7. Angle A is measured from an apex 555 of the notch 206.

An additive manufacturing machine 550 is shown laying down layers 551, 552, 553 and 554 for forming the wall 549. Preferably the notch angle is less than 45 degrees since the rightmost extent of the layers 551-554 is effectively unsupported when initially laid down. An angle of 45 degrees can typically be formed as a material will solidify quickly enough, even unsupported.

Although embodiment have been disclosed, a worker of skill in this art would recognize that modification would come within the scope of this disclosure. For that reason, the following claims should be studied to determine the true scope and content of this disclosure.

What is claimed is:

1. A gas turbine engine comprising:
    a core engine including a compressor and a turbine;
    acoustic structure positioned on a surface of the gas turbine engine, and the acoustic structure including at least a pair of adjacent panels, said panels having edges, and said panels each defining a plurality of cells, a first of said at least a pair of acoustic panels connected to a second of said pair of acoustic panels at adjacent ones of said edges;
    there being a pair of spaced faces in each acoustic panel between which the plurality of cells extend, and there being openings in each of said edges of each of said adjacent acoustic panels, and between a first of said faces and a second of said faces, with the openings being spaced from both said first of said faces and said second of said faces with a securing member extending through said openings in each of said first and said second of said adjacent acoustic panels; and wherein the acoustic structure and the at least a pair of adjacent panels form a full-hoop structure centered on a rotational axis of the core engine.

2. The gas turbine engine as set forth in claim 1, wherein the plurality of cells are generally diamond shaped and the edges extend along a zigzag path.

3. The gas turbine engine as set forth in claim 1, wherein the plurality of cells are generally square shaped and the edges are generally straight.

4. The gas turbine engine as set forth in claim 1, wherein said openings in each of said edges of said first and second panels extend into an outer surface of said edges, with the openings in each of said edges in the first and the second said acoustic panel being adjacent to each other and receiving the securing member.

5. The gas turbine engine as set forth in claim 4, wherein said openings in said edges of said first and second panels are angled notches.

6. The gas turbine engine as set forth in claim 5, wherein the notches extend at an angle that is less than 45 degrees relative to an apex of the angled surfaces.

7. The gas turbine engine as set forth in claim 1, wherein the openings are holes through walls defining the edges.

8. The gas turbine engine as set forth in claim 1, wherein the securing member is a solid pin.

9. The gas turbine engine as set forth in claim 1, wherein the securing member extends outwardly beyond the acoustic structure and is utilized to secure the acoustic structure to another structure.

10. The gas turbine engine as set forth in claim 1, wherein there is a fan and a surrounding fan case and the acoustic structure is positioned on an inner surface of said fan case.

11. The gas turbine engine as set forth in claim 1, wherein a perforated face sheet is positioned radially inward of the at least a pair of adjacent panels, and over the plurality of cells.

\* \* \* \* \*